United States Patent
Yonemoto (10) Patent No.: US 8,924,839 B2
(45) Date of Patent: Dec. 30, 2014

(54) ELECTRONIC READER SYSTEM WITH BOOKMARKING AND METHOD OF OPERATION THEREOF

(75) Inventor: Andrew Yonemoto, San Jose, CA (US)

(73) Assignee: Sony Corporation, Tokyo (JP)

( * ) Notice: Subject to any disclaimer, the term of this patent is extended or adjusted under 35 U.S.C. 154(b) by 343 days.

(21) Appl. No.: 13/029,120

(22) Filed: Feb. 17, 2011

(65) Prior Publication Data

US 2012/0216101 A1    Aug. 23, 2012

(51) Int. Cl.
*G06F 17/00* (2006.01)
*G06F 17/30* (2006.01)

(52) U.S. Cl.
CPC .............................. *G06F 17/30035* (2013.01)
USPC .......................................... 715/206; 715/200

(58) Field of Classification Search
CPC .................................................. G06F 17/30876
USPC .................... 715/206, 200, 230–232
See application file for complete search history.

(56) References Cited

U.S. PATENT DOCUMENTS

| | | | |
|---|---|---|---|
| 6,100,890 A | | 8/2000 | Bates et al. |
| 6,157,381 A | * | 12/2000 | Bates et al. ................... 715/786 |
| 6,631,496 B1 | * | 10/2003 | Li et al. ......................... 715/200 |
| 6,992,687 B1 | | 1/2006 | Baird et al. |
| 7,110,529 B2 | | 9/2006 | Kang |
| 7,158,936 B2 | * | 1/2007 | Denenberg et al. ........ 704/270.1 |
| 7,421,426 B2 | | 9/2008 | Berstis et al. |
| 7,433,866 B2 | | 10/2008 | Berstis et al. |
| 2002/0033847 A1 | | 3/2002 | Masthoff |
| 2002/0078089 A1 | | 6/2002 | Bade et al. |
| 2003/0126560 A1 | | 7/2003 | Kurapati et al. |
| 2003/0135820 A1 | * | 7/2003 | Aasman ......................... 715/500 |
| 2004/0139047 A1 | * | 7/2004 | Rechsteiner et al. ............. 707/1 |
| 2005/0031303 A1 | * | 2/2005 | Park ................................ 386/69 |
| 2005/0108233 A1 | * | 5/2005 | Metsatahti et al. ............... 707/9 |
| 2006/0206480 A1 | * | 9/2006 | Heidloff et al. .................... 707/6 |
| 2006/0288273 A1 | * | 12/2006 | Erol et al. ...................... 715/512 |
| 2007/0150930 A1 | * | 6/2007 | Koivisto et al. ............... 725/134 |
| 2008/0235563 A1 | * | 9/2008 | Nakamura .................... 715/200 |
| 2011/0173524 A1 | * | 7/2011 | Chan et al. .................... 715/206 |
| 2012/0027380 A1 | * | 2/2012 | Marsh et al. .................. 386/241 |

FOREIGN PATENT DOCUMENTS

| | | |
|---|---|---|
| JP | 2005184182 A | 7/2005 |
| JP | 2007088967 A | 4/2007 |
| JP | 2007264752 A | 10/2007 |
| JP | 2008305088 A | 12/2008 |
| WO | WO 2010/112951 A1 | 10/2007 |
| WO | 2010117675 A1 | 10/2010 |

OTHER PUBLICATIONS

Office Action for JP Application No. 2011-284302 dated May 22, 2013.

* cited by examiner

*Primary Examiner* — Manglesh M Patel (74) *Attorney, Agent, or Firm* — Ishimaru & Associates LLP (57) ABSTRACT

A method of operation of an electronic reader system includes: identifying a first feature point on a first multimedia book when a behavior pattern matches or exceeds a threshold pattern; generating a first bookmark corresponding to the first feature point; ranking a mark importance priority of the first bookmark based on the behavior pattern; rendering the first bookmark for displaying on a display; and updating the display based on the mark importance priority.

20 Claims, 4 Drawing Sheets

ELECTRONIC READER SYSTEM WITH BOOKMARKING AND METHOD OF OPERATION THEREOF

TECHNICAL FIELD

The present invention relates generally to an electronic system, and more particularly to an electronic reader system with bookmarking.

BACKGROUND ART

Modern portable consumer and industrial electronics, especially client devices such as electronic reader systems, cellular phones, portable digital assistants, and combination devices, are providing increasing levels of functionality to support modern life including distributing and displaying multimedia books. Research and development in the existing technologies can take a myriad of different directions.

One resulting technology can provide multiple multimedia applications with multiple multimedia files, such as electronic books or electronic videos readable on an electronic reader (e-reader). As users become more empowered with the growth of e-reader devices, new and old paradigms begin to take advantage of this new device space. There are many technological solutions to take advantage of this new portable reader device opportunity. However, the tools available are often not efficient in properly bookmarking these multimedia files.

Thus, a need still remains for an electronic reader system with bookmarking to provide users records of stored locations in a multimedia book. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of an electronic reader system including: identifying a first feature point on a first multimedia book when a behavior pattern matches or exceeds a threshold pattern; generating a first bookmark corresponding to the first feature point; ranking a mark importance priority of the first bookmark based on the behavior pattern; rendering the first bookmark for displaying on a display; and updating the display based on the mark importance priority.

The present invention provides an electronic reader system, including: a location module, for identifying a first feature point on a first multimedia book when a behavior pattern matches or exceeds a threshold pattern; a builder module, coupled to the location module, for generating a first bookmark corresponding to the first feature point; a ranking module, coupled to the builder module, for ranking a mark importance priority of the first bookmark based on the behavior pattern; a rendering module, coupled to the ranking module, for rendering the first bookmark for displaying on a display; and an update module, coupled to the rendering module, for updating the display based on the mark importance priority.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a camera, a camcorder, a microelectromechanical system (MEMS), passive devices, or a combination thereof.

Figure 1:
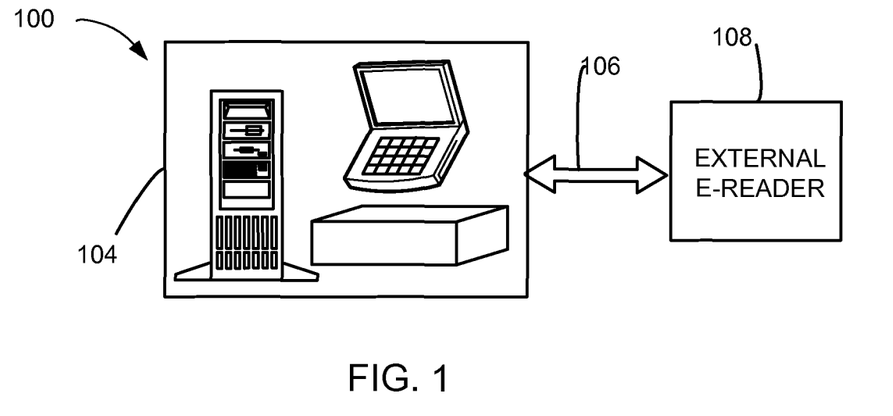
FIG. 1 is an electronic reader system with bookmarking in an embodiment of the present invention.

Referring now to FIG. 1, therein is shown an electronic reader system 100 with bookmarking in an embodiment of the present invention. The electronic reader system 100 can include a device 104. The device 104 is defined as a computing electronic apparatus. For example, the device 104 can be of any of a variety of mobile devices, such as a cellular phone, personal digital assistant, a notebook computer, a tablet PC, a tabletop computer, a smart surface, or other multi-functional mobile communication or entertainment device. The device 104 can be a standalone device, or can be incorporated with a larger electronic system, for example a home theatre system, a personal computer, or a vehicle. The device 104 can couple to a communication path 106 to communicate with external devices, such as an external electronic reader system 108.

For illustrative purposes, the electronic reader system 100 is described with the device 104 as a mobile computing device, although it is understood that the device 104 can be different types of computing devices. For example, the device 104 can also be a non-mobile computing device, such as a server, a server farm, or a desktop computer.

In another example, the device 104 can be a particularized machine, such as a mainframe, a server, a cluster server, rack mounted server, or a blade server, or as more specific examples, an IBM System z10™ Business Class mainframe or a HP ProLiant ML™ server. Yet another example, the device 104 can be a particularized machine, such as a portable computing device, a thin client, a notebook, a netbook, a smartphone, personal digital assistant, or a cellular phone, and as specific examples, an Apple iPad™, an Apple iPhone™, Palm Centro™, or Moto Q Global™.

The communication path 106 can be a variety of networks. For example, the communication path 106 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 106. Ethernet, digital subscriber line (DSL), fiber to the home (FTTH), and plain old telephone service (POTS) are examples of wired communication that can be included in the communication path 106.

Further, the communication path 106 can traverse a number of network topologies and distances. For example, the communication path 106 can include direct connection, personal area network (PAN), local area network (LAN), metropolitan area network (MAN), wide area network (WAN) or any combination thereof.

Figure 2:
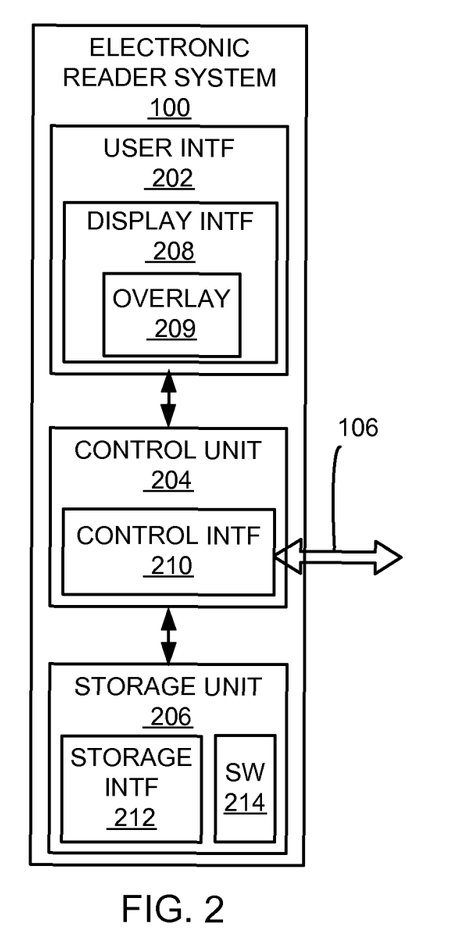
FIG. 2 is an exemplary block diagram of the electronic reader system.

Referring now to FIG. 2, therein is shown an exemplary block diagram of the electronic reader system 100. The electronic reader system 100 can include a user interface 202, a control unit 204, and a storage unit 206. The user interface 202 can include a display interface 208. The control unit 204 can include a control interface 210. The storage unit 206 can include a storage interface 212.

The user interface 202 allows a user to interface and interact with the electronic reader system 100. The user interface 202 can include an input device and an output device. Examples of the input device of the user interface 202 can include a keypad, a touchpad, soft-keys, a keyboard, a microphone, a touch pad, a camera, a webcam or a combination thereof to provide data and communication inputs.

The user interface 202 can include a display interface 208. Examples of the output device of the user interface 202 can include the display interface 208. The display interface 208 can include a display, a projector, a video screen, a speaker, or a combination thereof. The display interface 208 can also be a touch screen, such that inputs can be received from the display interface 208. The display interface 208 can have an overlay layer 209 on top of display area for reading content. The overlay layer 209 is an additional layer for display separate from the main display. The overlay layer 209 can occupy entire view area to display supported graphics, video, or interaction media. The overlay layer 209 can also allow alpha-channel mask and transparency control. These two features allow the operator of the electronic reader system 100 to make bookmark of any shape and to generate depth-of-field effect when displayed.

The control unit 204 can execute a software 214 to provide the intelligence of the electronic reader system 100. The control unit 204 can operate the user interface 202 to display information generated by the electronic reader system 100. The control unit 204 can also execute the software 214 for the other functions of the electronic reader system 100, including receiving image information from the capturing device 100 of FIG. 1. The control unit 204 can further execute the software 214 for adjusting and updating the image information to display on or through the viewing device 106 of FIG. 1.

The control unit 204 can be implemented in a number of different manners. For example, the control unit 204 can be a processor, an embedded processor, a microprocessor, a hardware control logic, a hardware finite state machine, a digital signal processor, or a combination thereof.

The control unit 204 can include the control interface 210. The control interface 210 can be used for communication between the control unit 204 and other functional units in the electronic reader system 100. The control interface 210 can also be used for communication that is external to the electronic reader system 100.

The control interface 210 can receive information from the other functional units or from external sources, or can transmit information to the other functional units or to external destinations. The external sources and the external destinations refer to sources and destinations external to the electronic reader system 100.

The control interface 210 can be implemented in different ways and can include different implementations depending on which functional units or external units are interfacing with the control interface 210. For example, the control interface 210 can be implemented with a pressure sensor, an inertial sensor, a microelectromechanical system, optical circuitry, waveguides, wireless circuitry, wireline circuitry, or a combination thereof.

The storage unit 206 can store the software 214. The storage unit 206 can also store the relevant information, such as advertisements, preferred settings, operating system, previous adjustments and updates, or a combination thereof.

The storage unit 206 can be a volatile memory, a nonvolatile memory, an internal memory, an external memory, or a combination thereof. For example, the storage unit 206 can be a nonvolatile storage such as non-volatile random access memory, Flash memory, disk storage, or a volatile storage such as static random access memory.

The storage unit 206 can include the storage interface 212. The storage interface 212 can be used for communication between the control unit 204 and other functional units in the electronic reader system 100. The storage interface 212 can also be used for communication that is external to the electronic reader system 100.

The storage interface 212 can receive information from the other functional units or from external sources, or can transmit information to the other functional units or to external destinations. The external sources and the external destinations referred to as sources and destinations external to the electronic reader system 100.

The storage interface 212 can be implemented differently depending on which functional units or external units are being interfaced with the storage unit 206. The storage interface 212 can be implemented with technologies and techniques similar to the implementation of the control interface 210.

Figure 3:
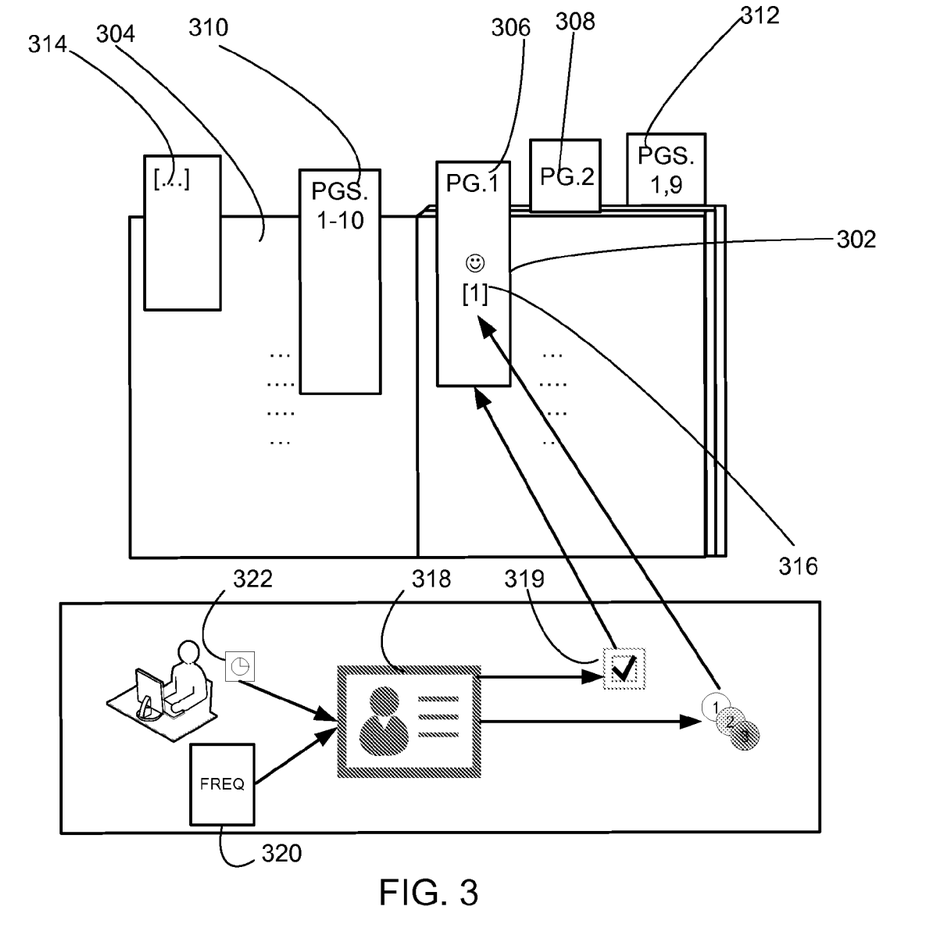
FIG. 3 is an example of an operation of the electronic reader system of FIG. 1.

Referring now to FIG. 3, therein is shown an example of an operation of the electronic reader system 100 of FIG. 1. The electronic reader system 100 is shown automatically creating a first bookmark 302, displaying it on the user interface 202 of FIG. 2, the display interface 208 of FIG. 2, or a combination thereof. The first bookmark 302 is a record of stored location or locations of a multimedia book or multimedia books. For example, the first bookmark 302 can be a stored location of a first multimedia book 304. The first bookmark 302 includes a first feature point 306.

The first multimedia book 304 is defined as any multimedia file for viewing on an electronic reader, capable of displaying or playing video, still images, text, sound, or a combination thereof, but not all are necessarily used or implemented. For example, the first multimedia book 304 can be an e-book, a video, a digital textbook, a digital magazine, or an audio book with a user interface. The first bookmark 302 can be a visual feature displayed on the electronic reader system 100 marking the first feature point 306 of multimedia files, such as the first multimedia book 304, stored on the storage unit 206 of FIG. 2. The first feature point 306 is defined as a location, a progress, a page number, a page range, or a time frame of the first multimedia book 304. The first feature point 306 can be a single location 308, locations 312, a range 310, a selected portion 314 of the first multimedia book 304, or a combination thereof.

The first feature point 306 can be identified by observing whether a behavior pattern 318 matches or exceeds a threshold pattern 319. The behavior pattern 318 is characteristics of a user or users' when viewing the first multimedia book 304. The electronic reader system 100 identifies the first feature point 306 based on measures of the behavior pattern 318 matching or exceeding preset thresholds.

Measures of the behavior pattern 318 include a frequency 320 of viewing the first feature point 306, a time duration 322 of viewing the first feature point 306, or a combination thereof. The frequency 320 of viewing is defined as a quantitative measure of how many times a user or users have viewed the first feature point 306. The time duration 322 of viewing is defined as, a quantitative measure of how long of a time period in aggregate have a user or users been viewing the first feature point 306. The threshold pattern 319 can be given by the user or the electronic reader system 100. Measures of the threshold pattern 319 is the same as the measures of the behavior pattern 318.

The first feature point 306 can also be identified by the first multimedia book 304, such as books with chapter markers. The first feature point 306 can further be identified by the user or users. The user or users can set the first feature point 306 to coincide with a book chapter for books without chapter markers.

The first bookmark 302 also includes a mark importance priority 316. The electronic reader system 100 can rank the mark importance priority 316 based on the behavior pattern 318. The mark importance priority 316 is a ranking of how important the first feature point 306 is to the user as measured by the behavior pattern 318.

It has been discovered that the present invention provides the electronic reader system 100 with the first bookmark 302 that is more relevant for users of an e-reader. By generating the first bookmark 302 and the mark importance priority 316 of the first bookmark 302 from the behavior pattern 318, the electronic reader system 100 can accurately identify the first feature point 306 of the first multimedia book 304 that is of interest to users/readers, saving the user's time from manually making those bookmarks. The electronic reader system 100 can sometimes identify the first feature point 306 of the first multimedia book 304 that the users do not even consciously realize are relevant. As a result, generating the first bookmark 302 and the mark importance priority 316 of the first bookmark 302 from the behavior pattern 318 can aid the users to identify the first bookmark 302 that is more relevant.

The display of the first bookmark 302 can overlay on top of the display of the first multimedia book 304 using the overlay layer 209 of FIG. 2. By providing the overlay layer 209, the electronic reader system 100 can display the first bookmark 302 independently, separate from main viewing of the first multimedia book 304. This prevents hardware and software interference between the modules for displaying the first multimedia book 304 and displaying the first bookmark 302. By providing the overlay layer 209, the electronic reader system 100 will not touch the original content of the first multimedia book 304, thereby preserving the integrity of the publishers.

Figure 4:
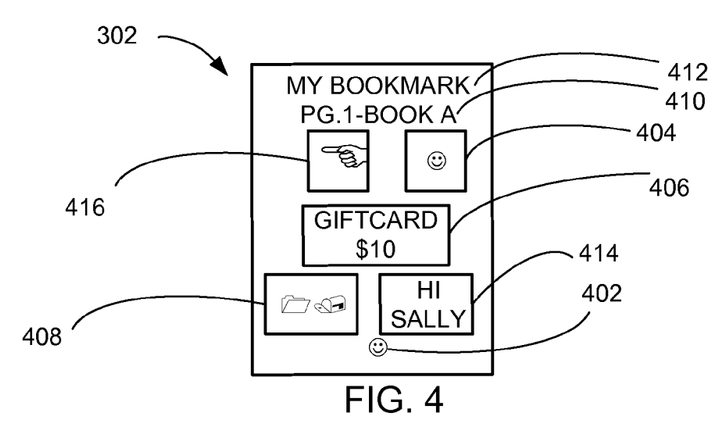
FIG. 4 is an example of the first bookmark.

Referring now to FIG. 4, therein is shown an example of the first bookmark 302. The first bookmark 302 can also include a multimedia content 402, a content container 404 of the multimedia content 402, a monetary medium 406, and a mark-related metadata 408. The multimedia content 402 can include graphics, audio, video, or interactive digital objects such as Adobe Flash™ or HTML5.

The content container 404 of the multimedia content 402 is a digital object that stores an arrangement of the multimedia content 402. The monetary medium 406 is a digital method of transferring credit or debt to another, such as a gift card, a debit card, a coupon, or a promotion code. The monetary medium 406 can include type of monetary medium, serial number for redemption, monetary amount, date of issuance, sender information, recipient name, or a combination thereof. As a specific example, the monetary medium can be a $10 gift card as shown.

The mark-related metadata 408 is a set of information regarding the creation of the first bookmark 302 associated with the behavior pattern 318 when viewing the first multimedia book 304. The mark-related metadata 408 can include a publication identifier 410, the first feature point 306, publication information, location information, and a bookmark title 412. The publication identifier 410 is a digital number, string, or code representing which publication the first bookmark 302 is referring to, such as the text string "BOOK A". The bookmark title 412 is the title of the first bookmark 302, such as the title "MY BOOKMARK".

The first bookmark 302 can also include a message 414. The message 414 is content created or delivered by the user for sending to an external device. The message 414 can take the form a greeting card, an ordinary multimedia file, a set of multimedia files, collectible or novelty interactive object or objects, or a string of text. For example, the message 414 is shown to be a text string of "HI SALLY".

It has been discovered that the present invention provides the electronic reader system 100 with additional interactive real estate for electronic marketing and advertising on an e-reader. By providing the first bookmark 302 including the content container 404, the multimedia content 402, the message 414, or the monetary medium 406, the electronic reader system 100 can provide additional interactive real estate for electronic marketing and advertising on an e-reader whenever a user accesses the first bookmark 302. A user accesses the first bookmark 302 presumably before starting to read, and hence would not be as distracted as when electronic marketing and advertisement appears while reading. As a result, providing the first bookmark 302 with the content container 404, the multimedia content 402, or the monetary medium 406 can add additional interactive real estate for electronic marketing and advertising on an e-reader.

The first bookmark 302 can also include an active script 416. The active script is an executable content in the first bookmark 302, such as Adobe Flash™ or HTML5. The active script 416 can act on contents of the first bookmark 302 or on external data. The active script 416 can include scripts to copy, paste, cut, activate, turn (the first bookmark 302), deactivate, customize, send, re-assign location, hide, unhide, prioritize, delete, group, collect, minimize, maximize, synchronize with the external electronic reader system 108 of FIG. 1, import, or export. The active script 416 can also include social networking support such as Facebook™ wall post or Twitter™ post regarding notification of newly obtained book, books in progress, and books read.

Figure 5:
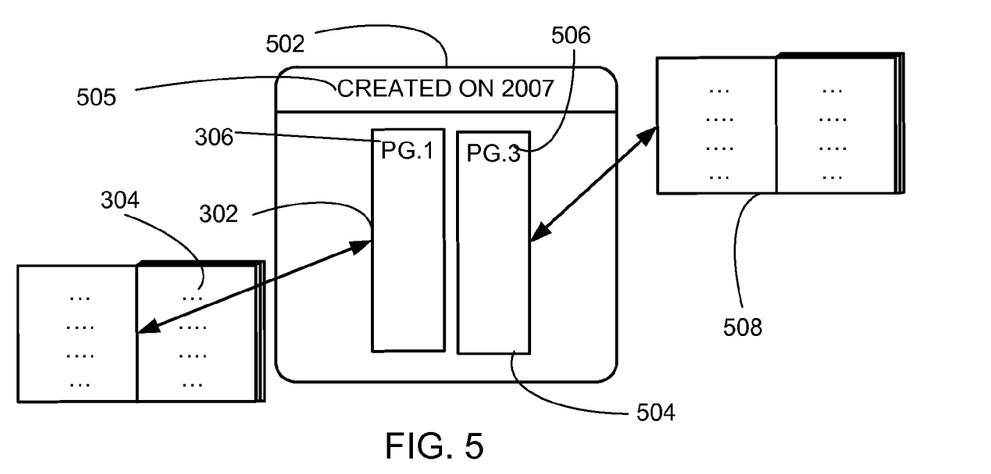
FIG. 5 is an example of a group of the first bookmark and a second bookmark.

Referring now to FIG. 5, therein is shown an example of a group 502 of the first bookmark 302 and a second bookmark 504. The group 502 is a set of bookmarks, such as a set of the first bookmark 302 and the second bookmark 504 sharing a commonality 505. The second bookmark 504 can refer to a second feature point 506. The second feature point 506 can refer to a second multimedia book 508, or to another location or locations of the first multimedia book 304. The group 502 can be displayed on the display interface 208 of FIG. 2.

For example, the commonality 505 can be based on matching metadata. The group 502 can be generated based on the commonality 505 between the first bookmark 302 and the second bookmark 504, and data matches between the first multimedia book 304 and the second multimedia book 508. The data matches between the first bookmark 302 and the second bookmark 504 can be related to a match in mark-related metadata 408 of FIG. 4, such as bookmark keyword, content name, type of feature point, comment, embedded graphic, creation date and time, creator, protection, format, or format of book content. The data matches between the first multimedia book 304 and the second multimedia book 508 can be related to a match in book title, chapter title, book genre, or user specified category, such as a user category of "words that moved me".

It has been discovered that the present invention provides the electronic reader system 100 with a more convenient way to record favorite feature points on an e-reader. By generating the group 502 for the first bookmark 302 and the second bookmark 504 based on the commonality 505, the electronic reader system 100 can accurately identify relevant related bookmarks, saving user's time from manually making those bookmarks. As a result, generating the group 502 from the first bookmark 302 and the second bookmark 504 can provide users with a more convenient way to record related favorite feature points on an e-reader.

Figure 6:
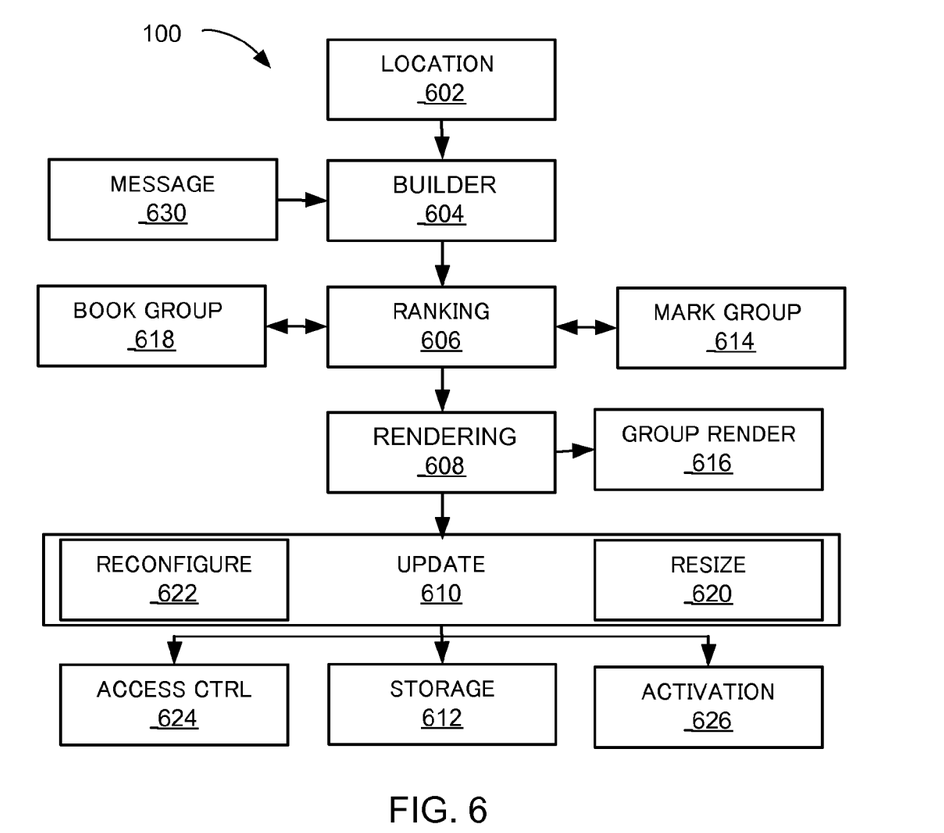
FIG. 6 is a control flow of the electronic reader system.

Referring now to FIG. 6, therein is shown a control flow of the electronic reader system 100. The electronic reader system 100 can include a location module 602. The location module 602 functions to identify a feature point or points on multimedia books when a user's behavior pattern matches or exceeds certain thresholds. For example, the location module 602 functions to identify the first feature point 306 of FIG. 3 on the first multimedia book 304 of FIG. 3 when the behavior pattern 318 of FIG. 3 matches or exceeds the threshold pattern 319 of FIG. 3.

For another example, the location module 602 can identify the first feature point 306 on the first multimedia book 304 based on the frequency 320 of FIG. 3 of the first feature point 306 viewed or on the time duration 322 of FIG. 3 of the first feature point 306 viewed. The first feature point 306 can be the range 310 of the locations 312 of FIG. 3, the selected portion 314 of FIG. 3, or the single location 308 of FIG. 3 on the first multimedia book 304.

The electronic reader system 100 can include a builder module 604, coupled to the location module 602. The builder module 604 functions to create a bookmark by recording the feature point identified with a user behavior pattern. For example, the builder module 604 functions to create the first bookmark 302 by recording the first feature point 306 along with the behavior pattern 318. The builder module 604 can generate the first bookmark 302 by recording the first feature point 306, the mark-related metadata 408 of FIG. 4, the behavior pattern 318 of FIG. 3, the monetary medium 406 of FIG. 4, the multimedia content 402 of FIG. 4, the content container 404 of FIG. 4, or a combination thereof.

The electronic reader system 100 can include a ranking module 606, coupled to the builder module 604. The ranking module 606 functions to rank priorities of bookmarks based on a user behavior pattern. For example, the ranking module 606 functions to rank the mark importance priority 316 of FIG. 3 of the first bookmark 302 based on the behavior pattern 318. The ranking module 606 can rank the mark importance priority 316 of the first bookmark 302 by correlating the mark importance priority 316 to the frequency 320 of the first feature point 306 viewed. The mark importance priority 316 can be a value linearly proportional to the frequency 320, such as the frequency 320 divided by a constant. For another example, the ranking module 606 can rank the mark importance priority 316 of the first bookmark 302 by correlating the mark importance priority 316 to the time duration 322 of the first feature point 306 viewed. The mark importance priority 316 can be a value linearly proportional to the time duration 322, such as the time duration 322 divided by a constant. Ranking the mark importance priority 316 can also be sorting all existing bookmarks based on the frequency 320, the time duration 322, or a combination thereof, and assigning the order number as the mark importance priority 316.

The electronic reader system 100 can include a rendering module 608, coupled to the ranking module 606. The rendering module 608 functions to render bookmarks on a display. For example, the rendering module 608 functions to render the first bookmark 302 on the display by showing the first bookmark 302 on the display interface 208 of FIG. 2 or by showing the first bookmark 302 on the overlay layer 209 of FIG. 2. The rendering module 608 can render the first bookmark 302 on the display interface 208 of FIG. 2 overlaying the first multimedia book 304 shown on the display interface 208.

The electronic reader system 100 can include an update module 610, coupled to the rendering module 608. The update module 610 functions to update a display based on priorities of bookmarks. For example, the update module 610 functions to update the display based on the mark importance priority 316. The update module 610 can update the display interface 208 by resizing or reshaping the first bookmark 302 based on the result of ranking the mark importance priority 316 of the first bookmark 302 based on the behavior pattern 318. As a specific example, the first bookmark 302 can be enlarged if the mark importance priority 316 is higher for the first feature point 306, such as due to increase in the frequency 320 of the first feature point 306 viewed or increase in the time duration 322 of the first feature point 306 viewed. The update module 610 can include a resize module 620, a reconfigure module 622, or a combination thereof.

The electronic reader system 100 can include the resize module 620, coupled to the update module 610. The resize module 620 functions to resize bookmarks on a display to indicate a change in priorities of the bookmarks. For example, the resize module 620 functions to resize the first bookmark 302 on the display to indicate change in the mark importance priority 316. The resize module 620 can enlarge the first bookmark 302 on the display interface 208 to indicate increase in the mark importance priority 316. For another example, the resize module 620 can shrink the first bookmark 302 on the display interface 208 to indicate decrease in the mark importance priority 316. For yet another example, the resize module 620 can enlarge the first bookmark 302 on one dimension on the display interface 208 to indicate increase in one measure of the mark importance priority 316, and decrease the first bookmark 302 on another dimension on the display interface 208 to indicate decrease in another measure of the mark importance priority 316.

The electronic reader system 100 can include the reconfigure module 622, coupled to the update module 610. The reconfigure module 622 functions to reconfigure bookmarks on display to indicate changes priorities of bookmarks. For example, the reconfigure module 622 functions to reconfigure the first bookmark 302 on the display to indicate change in the mark importance priority 316. The reconfigure module 622 can reconfigure the first bookmark 302 on the display interface 208 by changing color of the first bookmark 302 to indicate change in the mark importance priority 316. As a specific example, the reconfigure module 622 can reconfigure the first bookmark 302 on the display interface 208 by changing the first bookmark 302 rendered on the display interface 208 from a rectangle to a star.

The electronic reader system 100 can include a storage module 612, coupled to the update module 610. The storage module 612 functions to store a bookmark on a storage unit including at least a reference publication identifier, a feature point, and a priority of the bookmark. For example, the storage module 612 functions to store the first bookmark 302 on the storage unit 206 of FIG. 2 including at least the mark importance priority 316, the first feature point 306, and the publication identifier 410 of FIG. 4 for the first multimedia book 304. For another example, the storage module 612 can store the first bookmark 302 on the storage unit 206 including storing at least one of the mark importance priority 316, the first feature point 306, the publication identifier 410, the multimedia content 402, the content container 404, the monetary medium 406, or other the mark-related metadata 408.

The electronic reader system 100 can include a mark group module 614, coupled to the ranking module 606. The mark group module 614 functions to form a group of bookmarks based on a commonality amongst the bookmarks. For example, the mark group module 614 functions to form the group 502 of FIG. 5 with the second bookmark 504 of FIG. 5 and the first bookmark 302 based on the commonality 505 of FIG. 5 between the second bookmark 504 and the first bookmark 302.

In a specific example, the mark group module 614 can group the second bookmark 504 with the first bookmark 302 based on similar time durations of viewing within a user defined threshold that triggered the generation of the second bookmark 504 and the first bookmark 302. For another example, the mark group module 614 can group the second bookmark 504 with the first bookmark 302 based on similar frequencies of viewing within a user defined threshold that triggered the generation of the second bookmark 504 and the first bookmark 302. For yet another example, the mark group module 614 can group the second bookmark 504 with the first bookmark 302 based on the second bookmark 504 and the first bookmark 302 having the same feature point.

The electronic reader system 100 can include a group render module 616, coupled to the rendering module 608. The group render module 616 functions to render a group of bookmarks on a display. For example, the group render module 616 functions to render the group 502 on the display. For another example, the group render module 616 can render the group 502 on the display interface 208 by displaying a title for the group 502 and an icon for the group 502.

The electronic reader system 100 can include a book group module 618, coupled to the ranking module 606. The book group module 618 functions to form a group of bookmarks based on a commonality between the books that the bookmarks reference. For example, the book group module 618 functions to form the group 502 with the second bookmark 504 of the second multimedia book 508 of FIG. 5 and the first bookmark 302 based on the commonality 505 between the first multimedia book 304 and the second multimedia book 508.

For another example, the book group module 618 can group the second bookmark 504 with the first bookmark 302 when the second bookmark 504 and the first bookmark 302 refer to the same publication. For yet another example, the book group module 618 can group the second bookmark 504 with the first bookmark 302 when the second bookmark 504 and the first bookmark 302 refer to the same genre or type or category of publication. The genre, type, or category of publication can be part of metadata contained in the multimedia books, such as science fiction, mystery, magazine, large print, or DVD. For a further example, the book group module 618 can group the second bookmark 504 with the first bookmark 302 when the second bookmark 504 and the first bookmark 302 refer to the same date of publication, author, or other characteristics of publication.

The electronic reader system 100 can include an access control module 624, coupled to the update module 610. The access control module 624 functions to apply digital rights management to bookmarks. For example, the access control module 624 functions to apply digital rights management to the first bookmark 302. The access control module 624 can apply digital rights management to the first bookmark 302 for managing collectible and/or novelty types of the first bookmark 302 by limiting access to the collectible or novelty bookmarks unless a passcode is provided.

The electronic reader system 100 can include an activation module 626, coupled to the update module 610. The activation module 626 functions to activate active scripts in a bookmark to modify a book on a display. For example, the activation module 626 functions to activate the active script 416 of FIG. 4 in the first bookmark 302 to modify the first multimedia book 304 on the display. As a specific example, the activation module 626 can activate the active script 416 in the first bookmark 302 to highlight certain portions of the first multimedia book 304. For another example, the activation module 626 can activate the active script 416 in the first bookmark 302 to activate and register the monetary medium 406 contained in the first bookmark 302. For yet another example, the activation module 626 can activate the active script 416 in the first bookmark 302 to find other similar locations as the first feature point 306 of the first bookmark 302 or to generate similar bookmarks.

The electronic reader system 100 can include a message module 630, coupled to the builder module 604. The message module 630 functions to send bookmarks containing messages from one device to another. For example, the message module 630 functions to send the first bookmark 302 containing the message 414 of FIG. 4 from the device 104 of FIG. 1 using the control interface 210 of FIG. 2 for displaying on the external electronic reader system 108 of FIG. 1.

The software 214 of FIG. 2 of the first device 100 of FIG. 13 can include the electronic reader system 100. For example, the software 214 can include the location module 602, the builder module 604, the ranking module 606, the rendering module 608, the update module 610, and the storage module 612.

The control unit 204 of FIG. 2 can execute the software 214 for the location module 602 to identify the first feature point 306 on the first multimedia book 304 based on the behavior pattern 318. The control unit 204 can execute the software 214 for the builder module 604 to generate the first bookmark 302 corresponding to the first feature point 306. The control unit 204 can execute the software 214 for the ranking module 606 to rank the mark importance priority 316 of the first bookmark 302 based on the behavior pattern 318.

The control unit 204 can execute the software 214 for the rendering module 608 to render the first bookmark 302 on the display. The control unit 204 can execute the software 214 for the update module 610 to update the display based on the mark importance priority 316. The control unit 204 can execute the software 214 for the storage module 612 to store the first bookmark 302 on the storage unit 206 including at least the mark importance priority 316, the first feature point 306, and the publication identifier 410 for the first multimedia book 304.

The control unit 204 can execute the display interface 208 of FIG. 2 to display the first bookmark 302. The software 214 can include the location module 602. Based on the size of the storage unit 206 of FIG. 2, the software 214 can include additional modules of the electronic reader system 100. The control unit 204 can execute the modules partitioned on the software 214 as previously described.

The user interface 202 of FIG. 2 can receive the behavior pattern 318 from the user, the electronic reader system 100, or a combination thereof for the ranking module 606, for example. The control unit 204 can operate the control interface 210 of FIG. 2 to send the first bookmark 302 to another device.

The location module 602 can use the control unit 204 to identify the first feature point 306 on the first multimedia book 304 based on the behavior pattern 318. The builder module 604 can use the control unit 204 to generate the first bookmark 302 corresponding to the first feature point 306. The ranking module 606 can use the control unit 204 to rank the mark importance priority 316 of the first bookmark 302 based on the behavior pattern 318. The rendering module 608 can use the display interface 208 to render the first bookmark 302 on the display interface 208. The update module 610 can use the control unit 204 to update the display interface 208 based on the mark importance priority 316.

The mark group module 614 can use the control unit 204 to group the second bookmark 504 with the first bookmark 302 based on the commonality 505 between the second bookmark 504 and the first bookmark 302 to form the group 502. The group render module 616 can use the display interface 208 to render the group 502 on the display interface 208. The book group module 618 can use the control unit 204 to group the second bookmark 504 with the first bookmark 302 based on the commonality 505 between the first multimedia book 304 and the second multimedia book 508 to form. The resize module 620 can use the display interface 208 to resize the first bookmark 302 to indicate change in the mark importance priority 316. The reconfigure module 622 can use the display interface 208 to reconfigure the first bookmark 302 to indicate change in the mark importance priority 316.

The access control module 624 can use the control unit 204 to apply digital rights management to the first bookmark 302. The activation module 626 can use the control unit 204 and the display interface 208 to activate the active script 416 in the first bookmark 302 to modify the first multimedia book 304 shown on the display interface 208. The message module 630 can use the control interface 210 to send the first bookmark 302 containing the message 414 for displaying on the external electronic reader system 108 of FIG. 1.

The activation module 626 can access the active script 416 for activation from the storage unit 206. The builder module 604 or the storage module 612 can store the first bookmark 302 and the multimedia content 402 in the storage unit 206.

The electronic reader system 100 can also be implemented as additional functional units in the device 104. For example, the location module 602 can be an additional functional unit in the device 104. The electronic reader system 100 describes the module functions or order as an example. The modules can be partitioned differently. For example, the location module 602 and the builder module 604 can be combined. Each of the modules can operate individually and independently of the other modules.

Furthermore, data generated in one module can be used by another module without being directly coupled to each other. For example, the rendering module 608 can receive the first bookmark 302 for displaying from the builder module 604.

Figure 7:
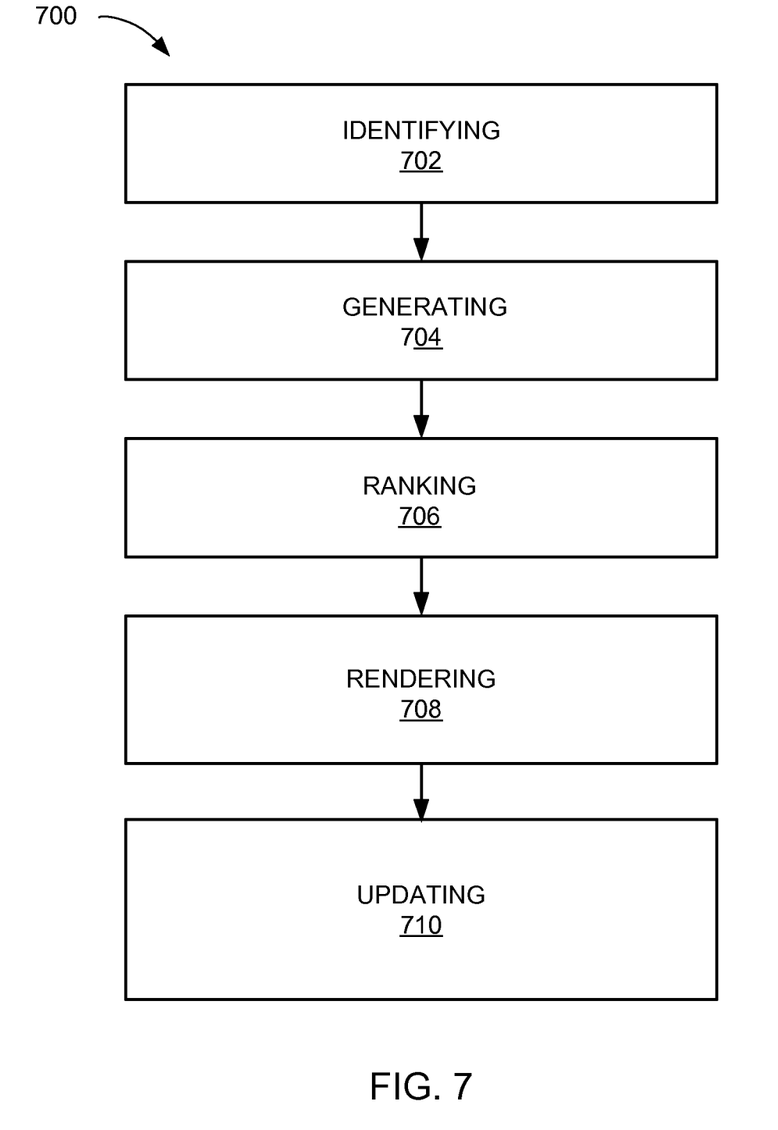
FIG. 7 is a flow chart of a method of operation of the electronic reader system in a further embodiment of the present invention.

Referring now to FIG. 7 therein is shown a flow chart of a method 700 of operation of an electronic system in a further embodiment of the present invention. The method 700 includes: identifying a first feature point on a first multimedia book when a behavior pattern matches or exceeds a threshold pattern in a block 702; generating a first bookmark corresponding to the first feature point in a block 704; ranking a mark importance priority of the first bookmark based on the behavior pattern in a block 706; rendering the first bookmark for displaying on a display in a block 708; and updating the display based on the mark importance priority in a block 710.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an electronic reader system comprising:
    identifying a first feature point on a first multimedia book when a behavior pattern matches or exceeds a threshold pattern, the behavior pattern includes a frequency of viewing the first feature point;
    automatically generating a first bookmark corresponding to the first feature point;
    ranking a mark importance priority of the first bookmark based on the behavior pattern;
    rendering the first bookmark for displaying on a display of a device; and
    automatically updating the display based on a change in the mark importance priority by reshaping the outline of the first bookmark.

2. The method as claimed in claim 1 further comprising:
forming a group with a second bookmark and the first bookmark based on a commonality between the second bookmark and the first bookmark; and
rendering the group for displaying on the display.

3. The method as claimed in claim 1 further comprising:
forming a group with a second bookmark of a second multimedia book and the first bookmark based on a commonality between the first multimedia book and the second multimedia book; and
rendering the group on the display.

4. The method as claimed in claim 1 further comprising:
sending the first bookmark containing a message for displaying on an external reader system.

5. The method as claimed in claim 1 wherein generating the first bookmark includes generating a mark-related metadata of the behavior pattern, a multimedia content, a monetary medium, or a combination thereof.

6. A method of operation of an image processing system comprising:
identifying a first feature point on a first multimedia book when a behavior pattern matches or exceeds a threshold pattern, the behavior pattern includes a frequency of viewing the first feature point;
automatically generating a first bookmark corresponding to the first feature point;
ranking a mark importance priority of the first bookmark based on the behavior pattern;
storing the first bookmark on a storage unit including the mark importance priority, the first feature point, a publication identifier for the first multimedia book, or a combination thereof;
rendering the first bookmark for displaying on a display of a device; and
automatically updating the display based on a change in the mark importance priority by reshaping the outline of the first bookmark.

7. The method as claimed in claim 6 wherein rendering the first bookmark includes displaying the first bookmark on an overlay layer.

8. The method as claimed in claim 6 wherein identifying the first feature point on the first multimedia book includes identifying the first feature point having a range of locations, a selected portion, or a single location on the first multimedia book.

9. The method as claimed in claim 6 further comprising applying digital rights management to the first bookmark.

10. The method as claimed in claim 6 further comprising activating an active script in the first bookmark to modify the first multimedia book for displaying on the display.

11. An electronic reader system comprising:
a control unit having a non-transitory memory, processor, or both;
a location module, for identifying a first feature point on a first multimedia book when a behavior pattern matches or exceeds a threshold pattern;
a builder module, coupled to the location module and the control unit, for automatically generating a first bookmark corresponding to the first feature point;
a ranking module, coupled to the builder module, for ranking a mark importance priority of the first bookmark based on the behavior pattern, the behavior pattern includes a frequency of viewing the first feature point;
a rendering module, coupled to the ranking module, for rendering the first bookmark for displaying on a display of a device; and
an update module, coupled to the rendering module, for automatically updating the display based on a change in the mark importance priority by reshaping the outline of the first bookmark.

12. The system as claimed in claim 11 further comprising:
a mark group module, coupled to the ranking module, for forming a group with a second bookmark and the first bookmark based on a commonality between the second bookmark and the first bookmark; and
a group render module, coupled to the mark group module, for rendering the group for displaying on the display.

13. The system as claimed in claim 11 further comprising:
a book group module, coupled to the ranking module, forming a group with a second bookmark of a second multimedia book and the first bookmark based on a commonality between the first multimedia book and the second multimedia book; and
a group render module, coupled to the mark group module, for rendering the group for displaying on the display.

14. The system as claimed in claim 11 further comprising:
a message module, coupled to the builder module, for sending the first bookmark containing a message for displaying on an external reader system.

15. The system as claimed in claim 11 wherein the first bookmark includes
a mark-related metadata of the behavior pattern, a multimedia content,
a monetary medium or a combination thereof.

16. The system as claimed in claim 11 further comprising:
a storage module, coupled to the ranking module, for storing the first bookmark on a storage unit including at least the mark importance priority, the first feature point, a publication identifier for the first multimedia book, or a combination thereof.

17. The system as claimed in claim 16 wherein the rendering module includes an overlay layer for displaying the first bookmark.

18. The system as claimed in claim 16 wherein:
the location module is for identifying the first feature point, the first feature point includes a range of locations, a selected portion, or a single location on the first multimedia book.

19. The system as claimed in claim 16 further comprising:
an access control module, coupled to the update module, for applying digital rights management to the first bookmark.

20. The system as claimed in claim 16 further comprising:
an activation module, coupled to the update module, for activating an active script in the first bookmark to modify the first multimedia book for displaying on the display.

* * * * *